United States Patent [19]

Ando et al.

[11] Patent Number: 5,027,280
[45] Date of Patent: Jun. 25, 1991

[54] MACHINING APPARATUS HAVING A MAIN SPINDLE SUPPORTED BY MAGNETIC BEARINGS

[75] Inventors: Shigenori Ando; Ryuji Iijima, both of Narashino, Japan

[73] Assignee: Seiko Seiki Kabushiki Kaisha, Japan

[21] Appl. No.: 265,689

[22] Filed: Nov. 1, 1988

[30] Foreign Application Priority Data

Jun. 11, 1987 [JP] Japan .................. 62-280516

[51] Int. Cl.$^5$ .............................. B24B 5/00
[52] U.S. Cl. .................. 364/474.16; 310/90.5; 51/134.5 R
[58] Field of Search ............ 310/90.5; 364/474.16; 51/134.5 R

[56] References Cited

U.S. PATENT DOCUMENTS

| | | | |
|---|---|---|---|
| 4,072,370 | 2/1978 | Wesson | 310/90.5 |
| 4,080,012 | 3/1978 | Boden | 310/90.5 |
| 4,180,946 | 1/1980 | Heijkenskjold | 310/90.5 |

FOREIGN PATENT DOCUMENTS

| | | |
|---|---|---|
| 0078421 | 5/1983 | European Pat. Off. . |
| 2644380 | 4/1977 | Fed. Rep. of Germany . |
| 2161844 | 7/1973 | France . |

OTHER PUBLICATIONS

Patent Abstracts of Japan, vol. 7, No. 179 (M-234), [1324] Aug. 9, 1983, Yamazaki Tekkosho K.K.

Primary Examiner—Allen R. MacDonald
Attorney, Agent, or Firm—Bruce L. Adams; Van C. Wilks

[57] ABSTRACT

A machining apparatus having a main spindle supported by magnetic bearings which controls machining conditions by controlling electric current values flowing in electromagnets according to predetermined conditions, thereby obtaining an optimum machining condition and thus improving accuracy and machining efficiency. The machining apparatus comprises a spindle having a tool at its one end, electromagnets for radially and axially supporting the spindle by magnetic force without contact to the spindle, position detecting means for detecting radial and axial positions of the spindle, control means responsive to outputs from the position detecting means for controlling current flowing in the electromagnets, current measuring means for measuring current values flowing in at least one of the electromagnets, and machining control means for controlling machining conditions by controlling current values at the electromagnets according to the measured current values.

17 Claims, 11 Drawing Sheets

5,027,280

MACHINING APPARATUS HAVING A MAIN SPINDLE SUPPORTED BY MAGNETIC BEARINGS

BACKGROUND OF THE INVENTION

The present invention relates to a machining apparatus having a main spindle supported by magnetic bearings, and more particularly to a machining apparatus which carries out works with a tool attached to one end of the spindle which is supported by magnetic bearings.

In a conventional machining apparatus, the machining condition is generally fixed by the material of a work piece, the tool being used, the machining method, etc. Therefore machining under an optimum condition is difficult because it is difficult to follow changes of the loads which are caused by various factors including the change of cutting resistance resulting from the change in the sharpness of the tool. Because of this problem, it is difficult to improve the machining accuracy and machining efficiency.

Some of the machining apparatus have overcome the abovementioned problem. For example, one machining apparatus is capable of controlling machining by the use of changes of electric power supplied to a spindle driving motor. Another machining apparatus is capable of controlling machining by the use of changes of the bearing pressure during machining.

However, these conventional machining apparatus suffer from problems, such as, outputs from the detectors change due to changes in revolution of the spindle, friction torque of the bearing, temperature of the bearing, etc., and therefore the detection sensitivity is low, and the response speed is slow.

SUMMARY OF THE INVENTION

An object of the invention is to provide a machining apparatus which controls machining conditions by controlling electric current values flowing in electromagnets according to predetermined conditions, thereby obtaining an optimum machining condition and thus improving machining accuracy and machining efficiency.

In order to solve the above mentioned problems, the present invention provides a machining apparatus having a main spindle supported by magnetic bearings which comprises a spindle having a tool at its one end, electromagnets for radially and axially supporting the spindle by magnetic forces without contacting the spindle; position detecting means for detecting radial and axial positions of the spindle; a control means responsive to outputs from the position detecting means for controlling currents flowing in the electromagnets; current measuring means for measuring current values flowing in at least one of the electromagnets; and a machining control means for controlling machining conditions by controlling current values at the electromagnets according to the measured current values.

According to the machining apparatus as described above, the machining controls means control electric current values flowing in the electromagnets according to predetermined conditions in order to produce an optimum machining condition, thereby carrying out machining under the optimum machining condition, for example, cutting load, cutting speed, lifetime of tools and so on, and thus improving the machining accuracy and machining efficiency.

BRIEF DESCRIPTION OF THE DRAWINGS

FIG. 1 illustrates an overall structure of the apparatus,

FIG. 2 is a block diagram of the machining control means,

FIG. 3 is a diagram showing cutting conditions of a tool or a cutting table,

FIG. 4 schematically shows the control diagram, and

FIG. 5 is a flow chart of the control steps.

FIG. 6 schematically shows the control diagram, and

FIG. 7 is a flow chart of the control steps.

FIG. 8 is a diagram showing the cutting conditions,

FIG. 9 schematically shows the control diagram, and

FIG. 10 is a flow chart of the control steps.

FIG. 11 schematically shows the control diagram, and

FIG. 12 is a flow chart of the control steps.

DETAILED DESCRIPTION OF THE PREFERRED EMBODIMENTS

The present invention is hereunder described with reference to the accompanying drawings. FIG. 1 to FIG. 5 show a first embodiment of the machining apparatus having a main spindle supported by magnetic bearings according to the present invention.

Figure 1:
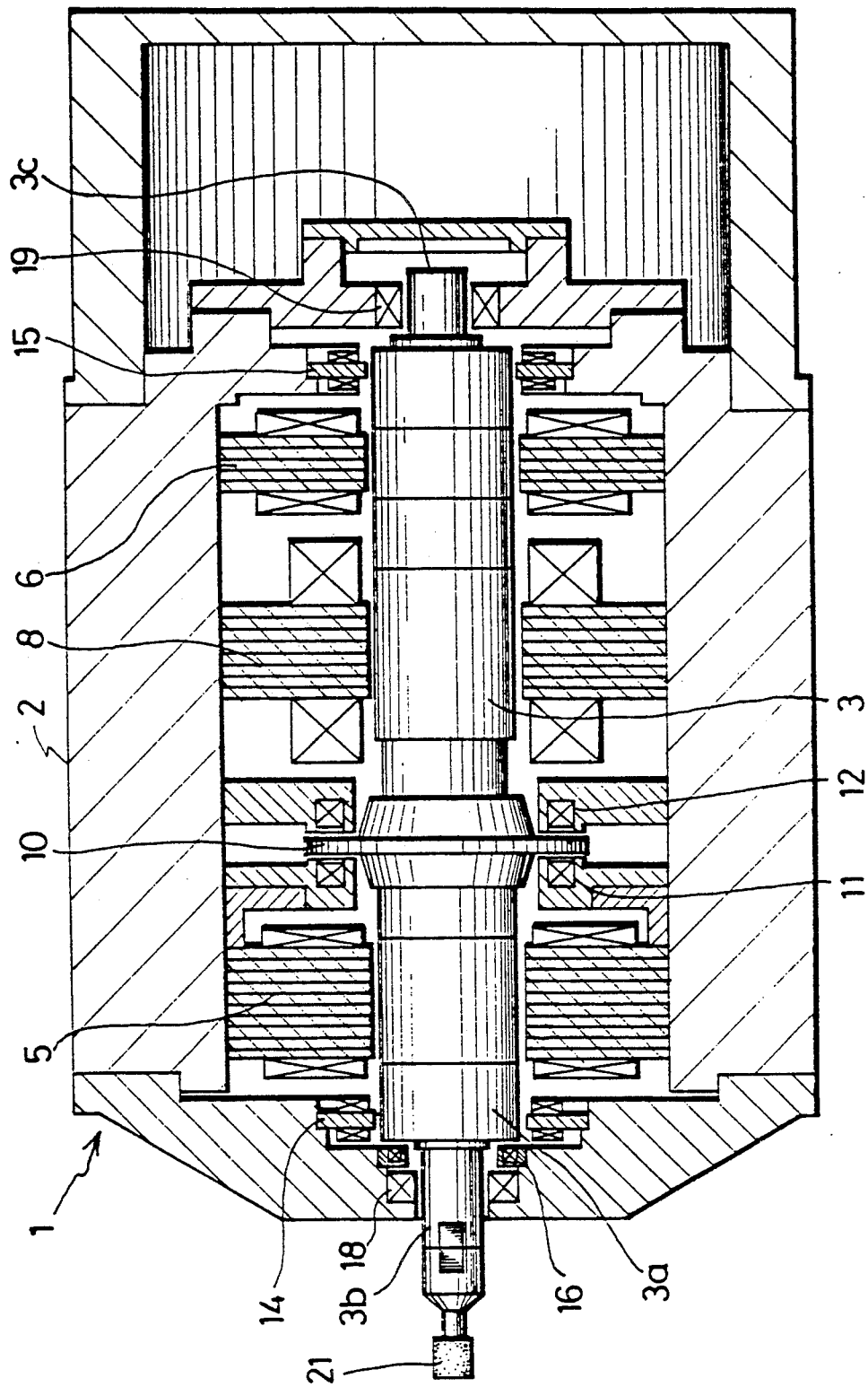
FIG. 1 to FIG. 5 show a first embodiment of the machining apparatus having a main spindle supported by magnetic bearings according to the present invention.

In a grinding apparatus 1 as shown in FIG. 1, a body 2 forms the exterior thereof. A spindle 3 is disposed along the axis of the body 2. Radial electromagnets 5 and 6 for electromagnetically floating and supporting the spindle 3 are provided around the both ends of the spindle 3 on the side of the body 2.

In the central region of the length of the spindle 3, a motor 8 for rotationally driving the spindle 3, and a pair of axial electromagnets 11 and 12 for restricting the axial displacement of the spindle 3 through a flange are disposed on the body 2.

A position sensor 14 (position detecting means) is provided on the body 2 in the vicinity of the radial electromagnet 5. The position sensor 14 detects a separation between the spindle 3 and the internal end face of the radial electromagnet 5 thereby detecting the radial position of the spindle 3. A position sensor 15 (position detecting means) for detecting also the radial position of the spindle 3 is provided in the vicinity of the radial electromagnet 6 on the body 2. A position sensor 16 (position detecting means) for detecting the axial position of the spindle 3 is provided on the body in the vicinity of a step 3a which is formed on one side of the spindle 3 (on the left-hand side in the figure).

Around a smaller diameter portion 3b on one end of the spindle 3 and around a smaller diameter portion 3c of the other end, protection bearings 18 and 19 are provided on the body 2 respectively. These protection bearings 18 and 19 directly support the spindle 3 at the smaller diameter portions 3b and 3c when the power supply to the radial electromagnets 5 and 6 is cut off and consequently they loose the magnetic force to float the spindle 3.

A cylindrical grinder 21 rotationally driven by the spindle 3 for grinding a work piece (not shown) is mounted at the tip of the smaller diameter portion 3b of the spindle 3.

Figure 2:
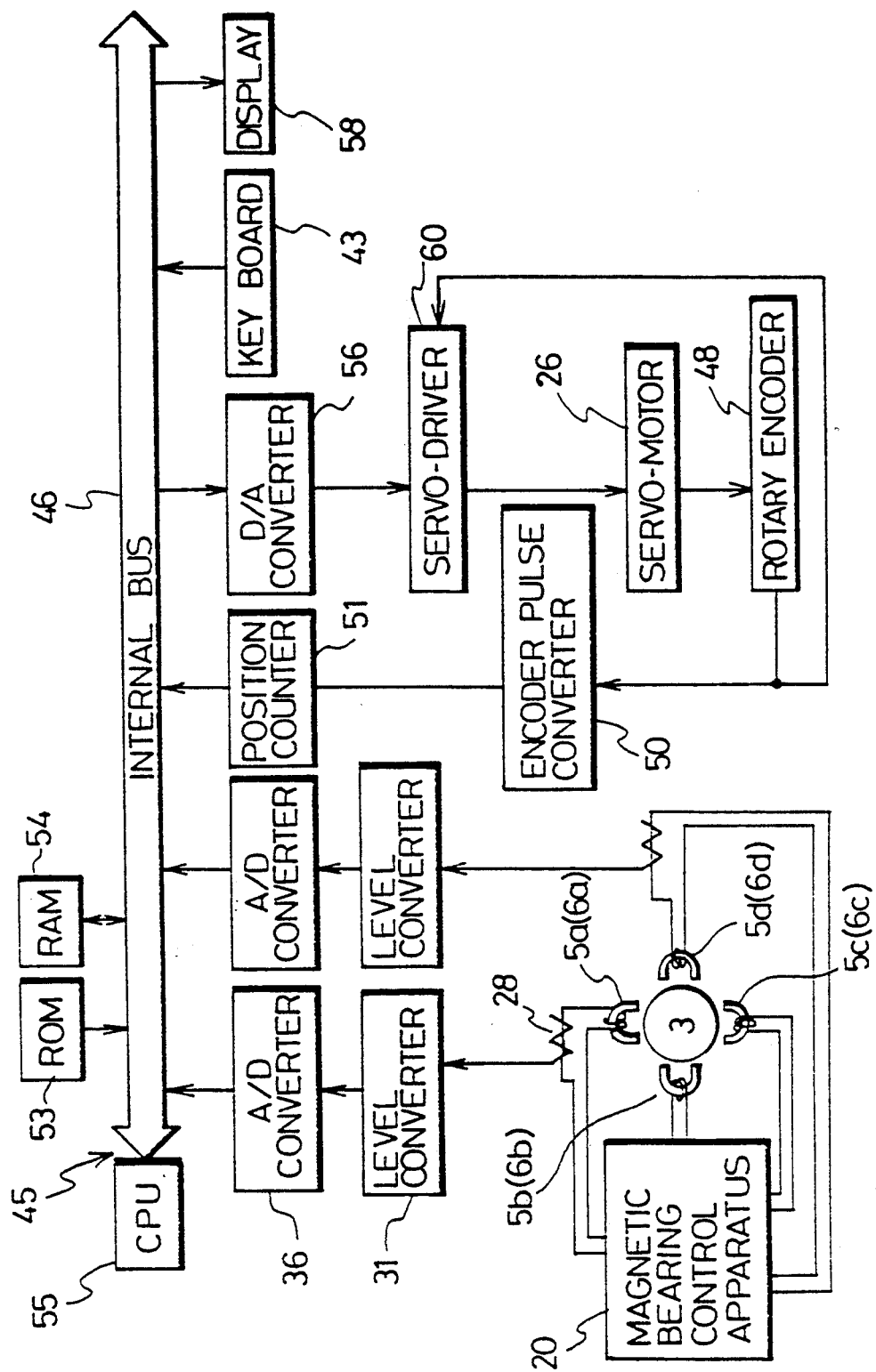

As shown in FIG. 2, one electromagnet on each up and down side, and right and left side of the spindle 3 one set of a total of four electromagnets 5 (5a-5d) and another set of a total of four electromagnets 6 (6a-6d), is provided adjacent to the spindle 3.

The radial electromagnets 5a (6a) and 5c (6c) are controlled by a magnetic bearing control apparatus 20 (control means) and magnetically float the spindle 3 in the neutral position in the vertical plane therebetween, and generate a magnetic force acting against a tangential component force of a machining load acting against the grinder 21 (they are hereinafter referred to as tangential direction electromagnets).

The radial electromagnets 5b (6b) and 5d (6d) magnetically float the spindle in the neutral position in the horizontal plane therebetween, and generate a magnetic force acting against a normal component force (in the cutting direction) of the machining load acting against the grinder 21 (they are hereinafter referred to as normal direction electromagnets). The workpiece is shifted relative to the spindle 3 for cutting by the rotation of a servo-motor 26 through a ball screw (not shown). A current flowing in the tangential direction electromagnets 5a (6a) is measured by a current transformer 28 (current measuring means) which produces an analogue measurement signal corresponding to the measured current value. The analogue measurement signal is converted by an A/D converter 36 into a digital measurement signal, and inputted into an internal bus 46 of a micro-computer 45 (machining control means).

The revolution of the servo-motor 26 is measured by a rotary encoder 48, and the position of a cutting table (not shown) is determined based on the measured revolution. Namely, a signal from the rotary encoder 48 is transmitted through an encoder pulse converter 50 and a position counter 51, and inputted into the internal bus 46. The micro-computer 45 operates to store in a RAM 54, change and erase predetermined data including predetermined current values, and predetermined reference values which are inputted from a keyboard 43 into the internal bus 46.

In the same manner as other ordinary CPUs, a CPU 55 (micro-processor) of the micro-computer 45 carries out functions of decoding, operating, and controlling according to a program stored in a ROM 53 the various data inputted into the internal bus 46 and stored in the ROM 53 and the RAM 54. A digital signal outputted through the internal bus 46 into a D/A converter 56 is converted into an analogue signal (voltage signal) therein. A servo-driver 60 rotates the servo-motor 26 according to the voltage signal, thereby shifting the cutting table by a required amount. A display apparatus 58 comprising a CRT or liquid crystal display, etc., displays necessary information including commands in response to digital signals inputted into the display apparatus 58 through the internal bus 46.

Figure 3:
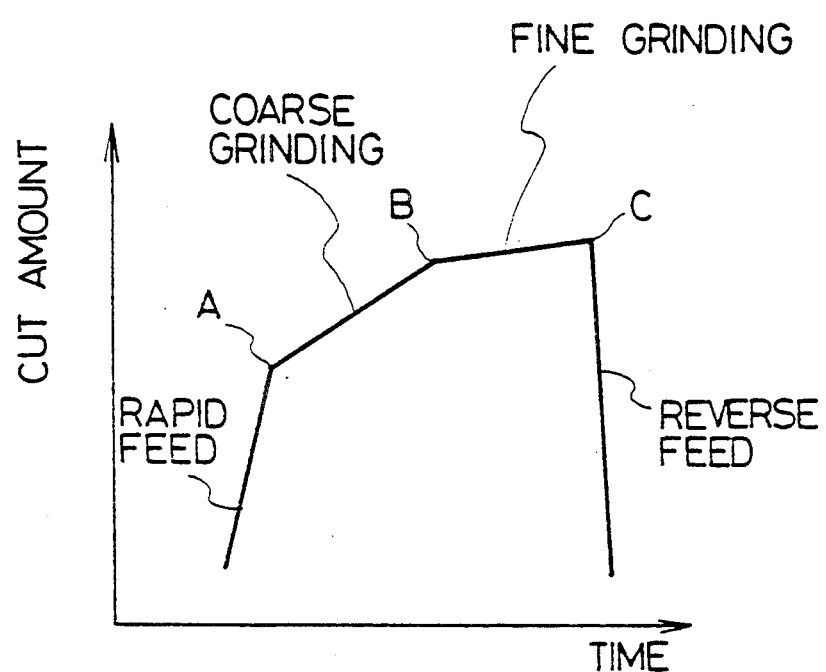

In a grinding apparatus 1 having a main spindle supported by magnetic bearings, as shown in a cutting condition diagram, in FIG. 3 for example, a workpiece is rapidly moved by the cutting table to position A adjacent to the grinder 21, then in the range between position A and position B, coarse grinding is carried out. During this range, the grinder 21 is fed from position A to position B with a constant load being applied thereto in the normal direction relative to the grinder 21 (cutting direction). For this purpose, the micro-computer 45 controls the servo-motor 26 so that a constant current always flows in the normal direction electromagnets 5b, 6b and 5d, 6d.

During the following range between position B and position C, fine grinding is carried out. The grinder 21 is also moved from position B to position C with a constant load being applied thereto in the normal direction, and the micro-computer 45 controls the servo motor 26 so that a constant current always flows in the normal direction electromagnets 5b, etc.

Figure 4:
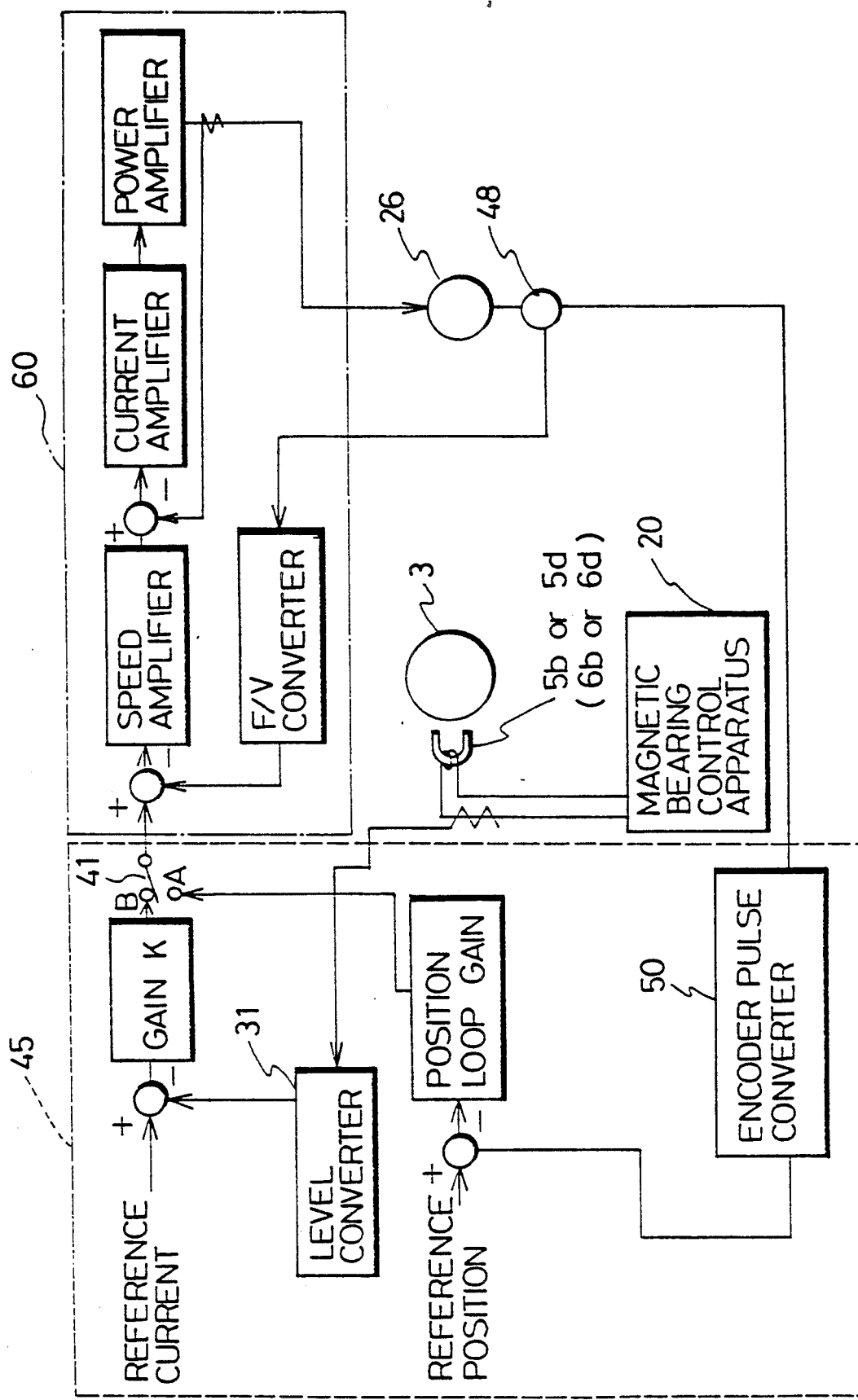
Figure 5:
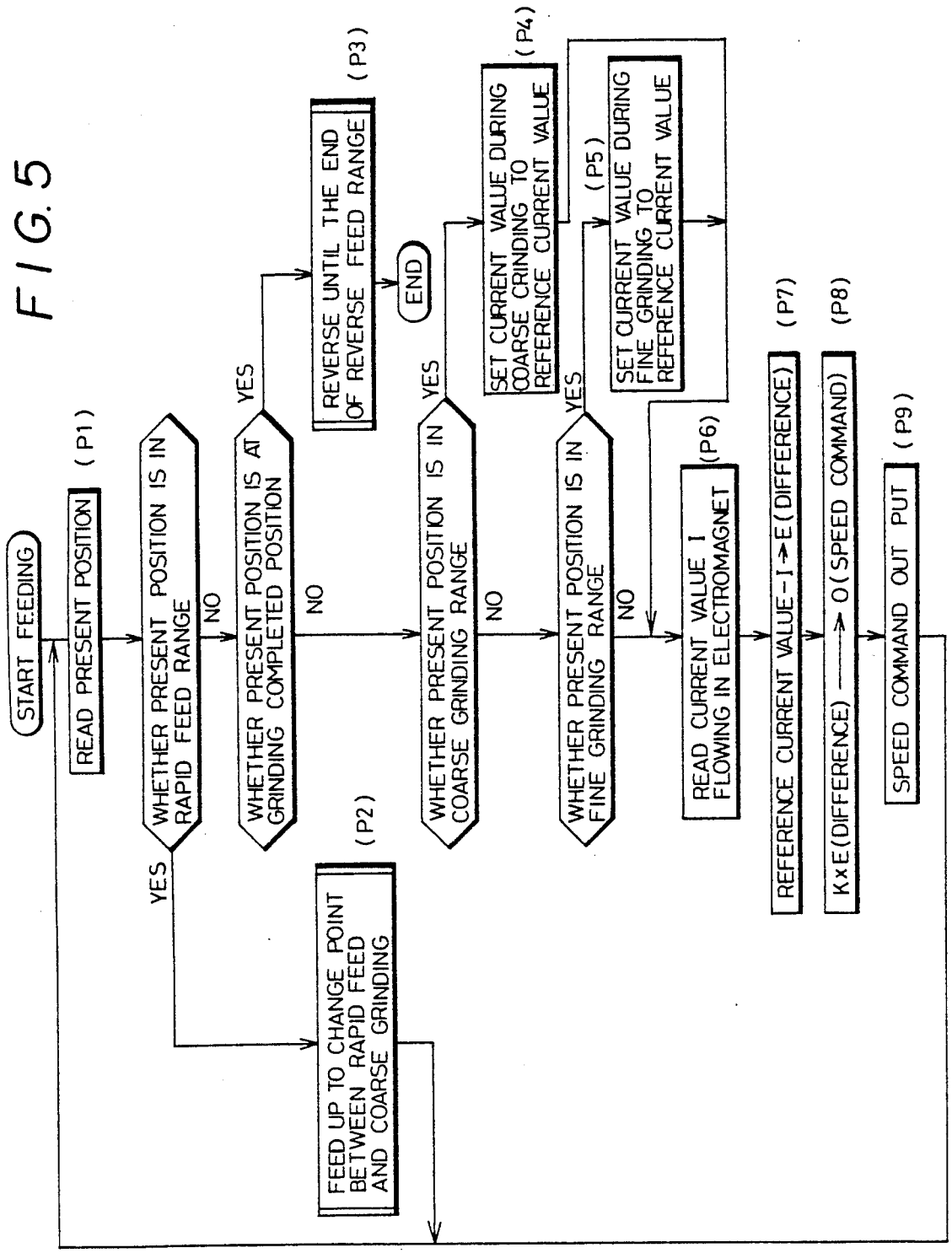

Further detail is hereunder described with reference to FIG. 4 and FIG. 5. After feeding of the cutting table is started, the position of the cutting table is read based on a signal from the rotary encoder 48 (P1). If the present position of the cutting table is in the rapid feeding range before position A, a switch 41 as shown in FIG. 4, connects with a terminal A, and the servo-driver 60 controls the servo-motor 26 while comparing the present position with the reference position based on signals from the rotary encoder 48, whereby the cutting table is rapidly moved to position A (P2).

On the other hand, when a signal from the rotary encoder 48 indicates that the cutting table reaches the point where grinding is completed (Position C), the servo-driver 60 controls the servo-motor 26 to reverse feed the table from point C (P3).

When a present position of the cutting table is in the coarse grinding range between point A and point B, the current flowing in the normal direction electromagnets 5b, etc., is set to a constant value for coarse grinding (reference current value) (P4). When the present position of the cutting table is in the fine grinding range between point B and point C, a current flowing in the normal direction electromagnets 5b, etc,. is set to a constant value for fine grinding (reference current value) (P5). During the above P4 and P5 steps, the switch 41 is connected with a terminal B.

Namely, a current value I flowing in the normal direction electromagnets 5b, etc., is read (P6), a difference E between the read current value and the predetermined value is calculated (P7), the difference E is multiplied by a gain K (P8), and a command is outputted into the servo-driver 60 so that the servo-motor revolves to produce a feeding speed at which a measured current value I is always in registration with the reference current value (P9).

As described above, the servo-motor 26 is controlled in such a manner that each of the loads in the normal direction during coarse grinding range and during fine grinding range becomes constant at a respectively different value, and thereby highly accurate grinding work including improved cylindricality of a workpiece becomes possible.

Figure 6:
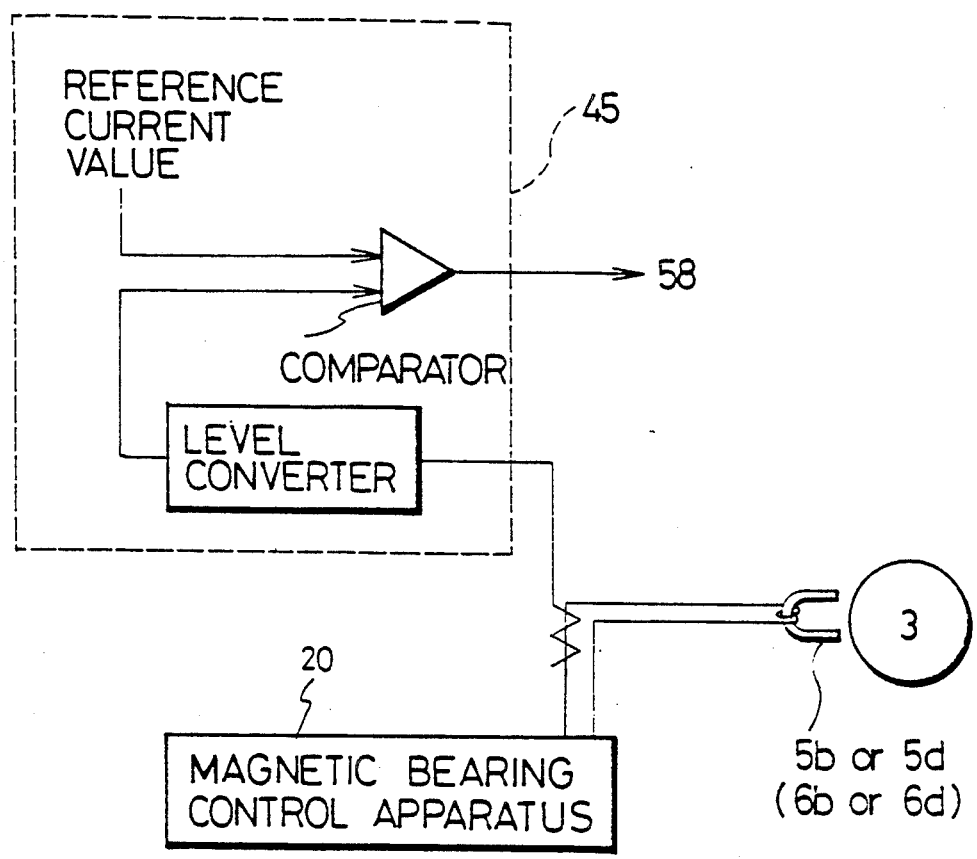
FIG. 6 and FIG. 7 show a second embodiment of the present invention.
Figure 7:
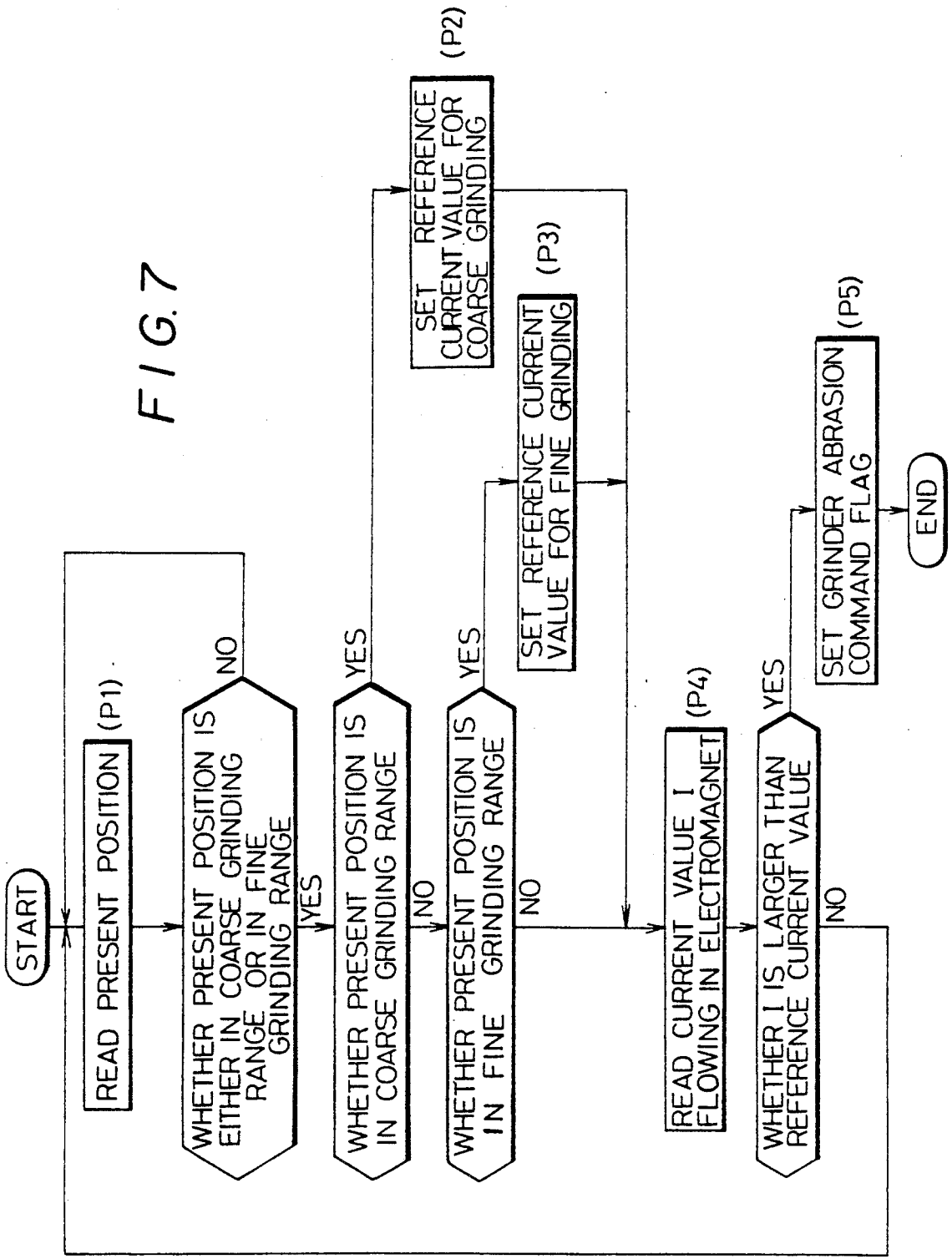

FIG. 6 and FIG. 7 show a second embodiment of the present invention. In the second embodiment, a cutting table is fed at a constant speed.

First, in FIG. 7, the position of the cutting table is read based on a signal from a rotary encoder 48 (P1), a hereinafter described reference current value for coarse grinding is set if the position of the cutting table is in the coarse grinding range (P2), and a reference current value for fine grinding is set if the position of the cutting table is in the fine grinding range (P3). Then, a current value I flowing in the normal direction electromagnets 5b, etc., is read (P4). When it is determined that the current value I exceeds the predetermined reference current value, it is judged that the grinder 21 is abraded, and a command, which requires the correction of the grinder after the completion of one cycle of grinding work and before the start of the following grinding work, is inputted into the display apparatus 58 (P5).

In this manner, the micro-computer 45 determines abrasion of the grinder 21 and outputs a command for correction of the grinder in order to carry out grinding work with an optimum cutting efficiency, whereby the grinding work is carried out with high accuracy and high efficiency.

Figure 8:
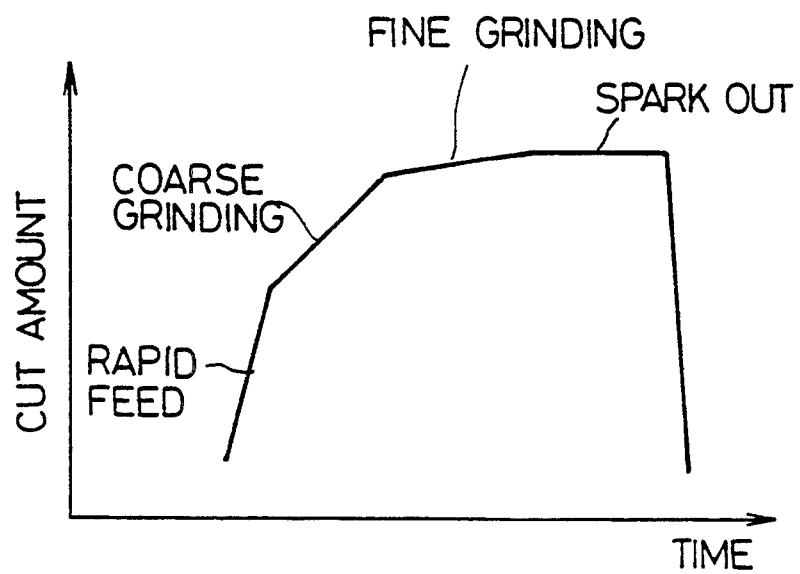
FIGS. 8, 9 and 10 show a third embodiment of the present invention.
Figure 9:
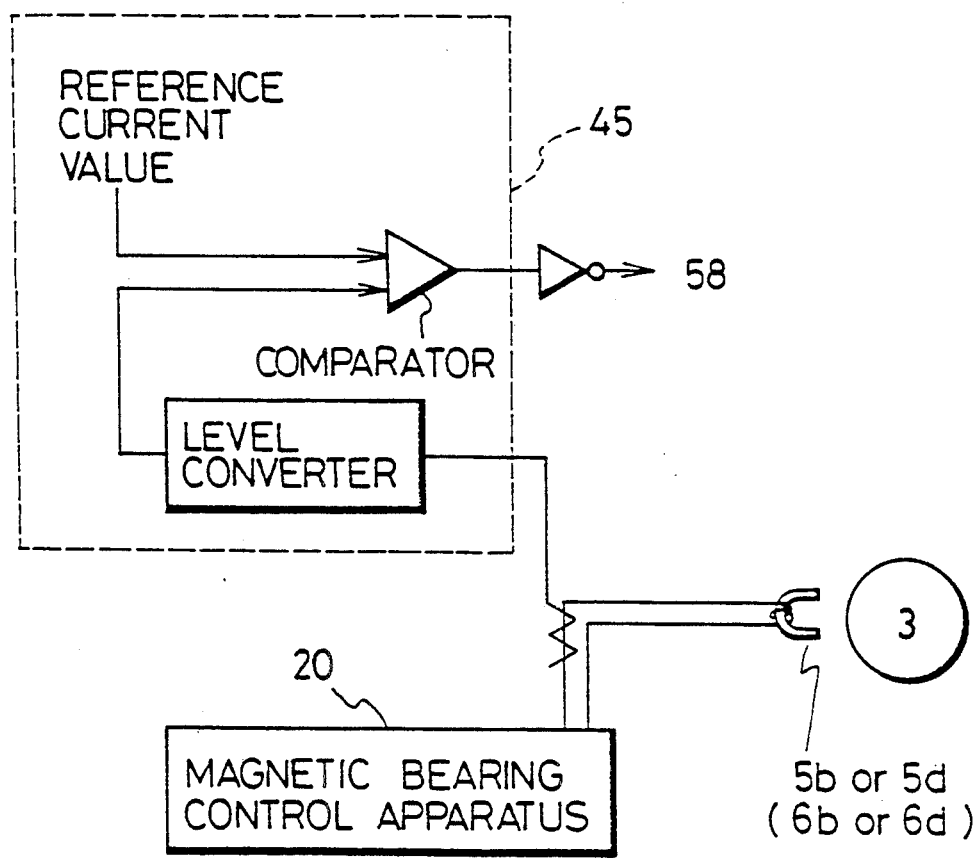
Figure 10:
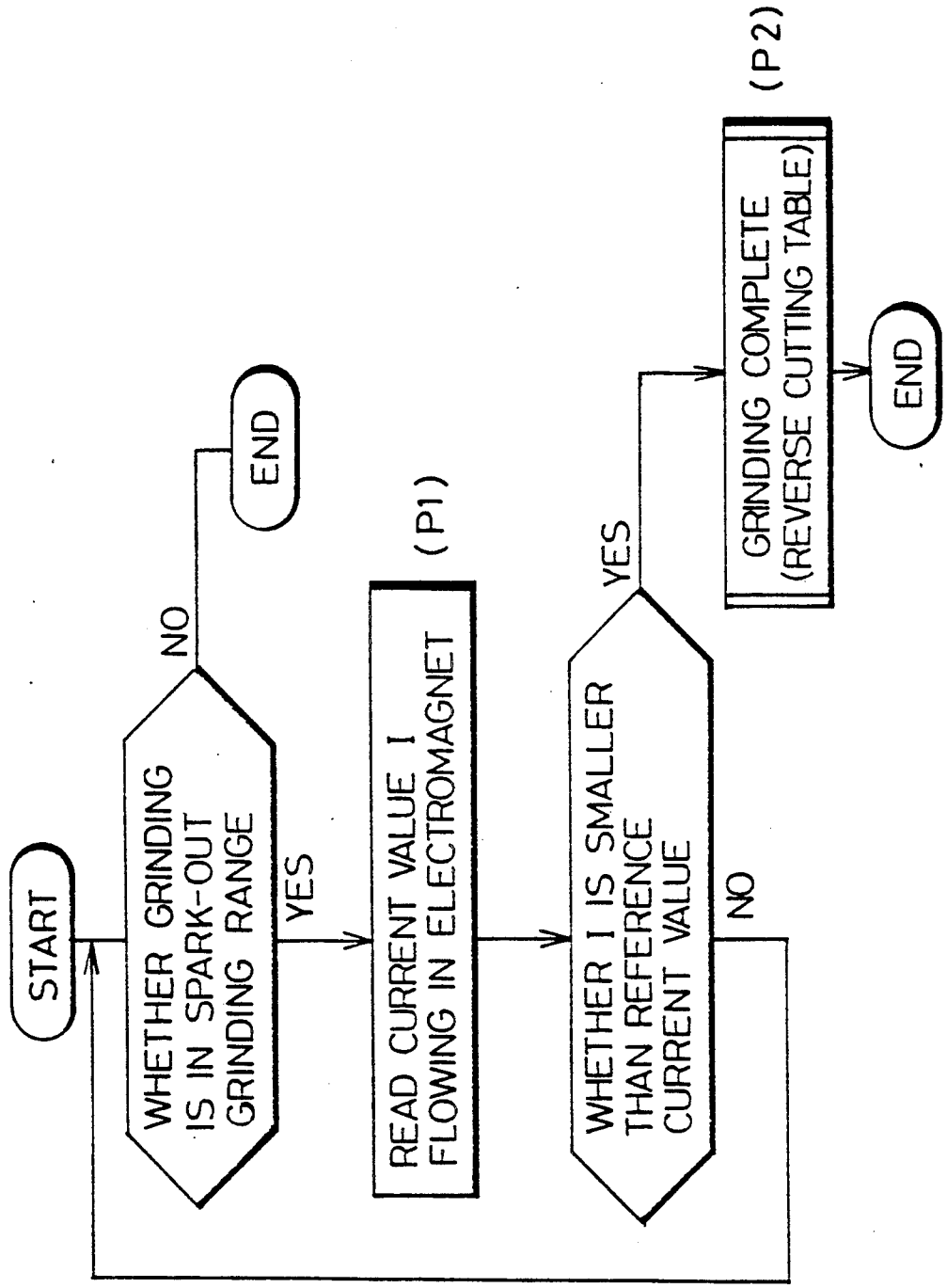

FIG. 8 to FIG. 10 show a third embodiment of the present invention. Among various grinding methods, there is a grinding method which includes one step of spark-out as shown in FIG. 8 in order to improve grinding accuracy. In the spark-out step, grinding is carried out with only the elastic restoring force of the tool holder while feeding of the workpiece is stopped. Conventionally, the time for spark-out is equally fixed for every cycle of grinding work by a timer. Because of this, an unnecessarily long time is sometimes spent for spark-out which eventually increases the otherwise shorter time for one cycle of grinding work, thereby resulting in lowered efficiency.

The third embodiment is used in order to solve this problem. During spark-out grinding, a current value I flowing in normal direction electromagnets 5b, etc. is read according to a signal from a rotary encoder 48 (P1). When it is determined that the current value I becomes lower than a predetermined current value, and therefore further spark-out grinding is not required, the grinding work is completed (P2). In this manner, the time for spark-out is made shorter than a time fixed by a timer, the grinding work time is shortened, and the efficiency is improved.

Figure 11:
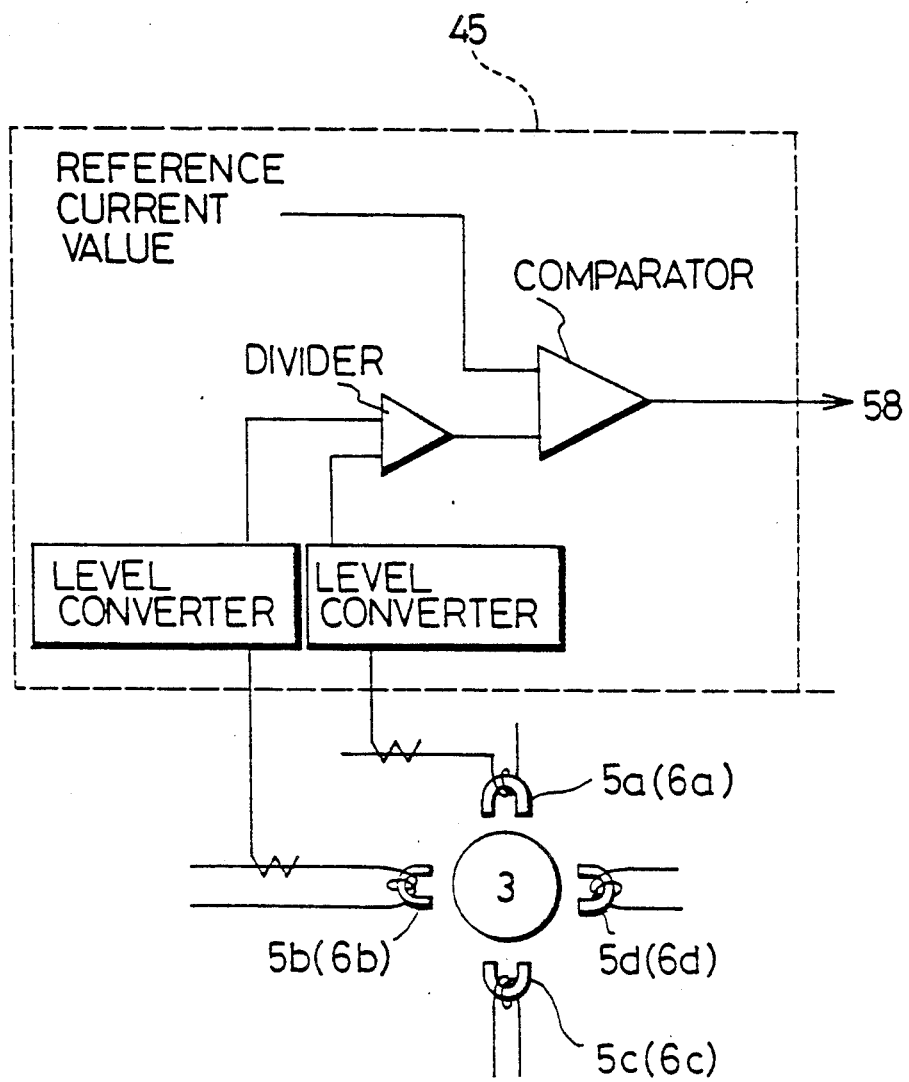
FIG. 11 and FIG. 12 show a fourth embodiment of the present invention.
Figure 12:
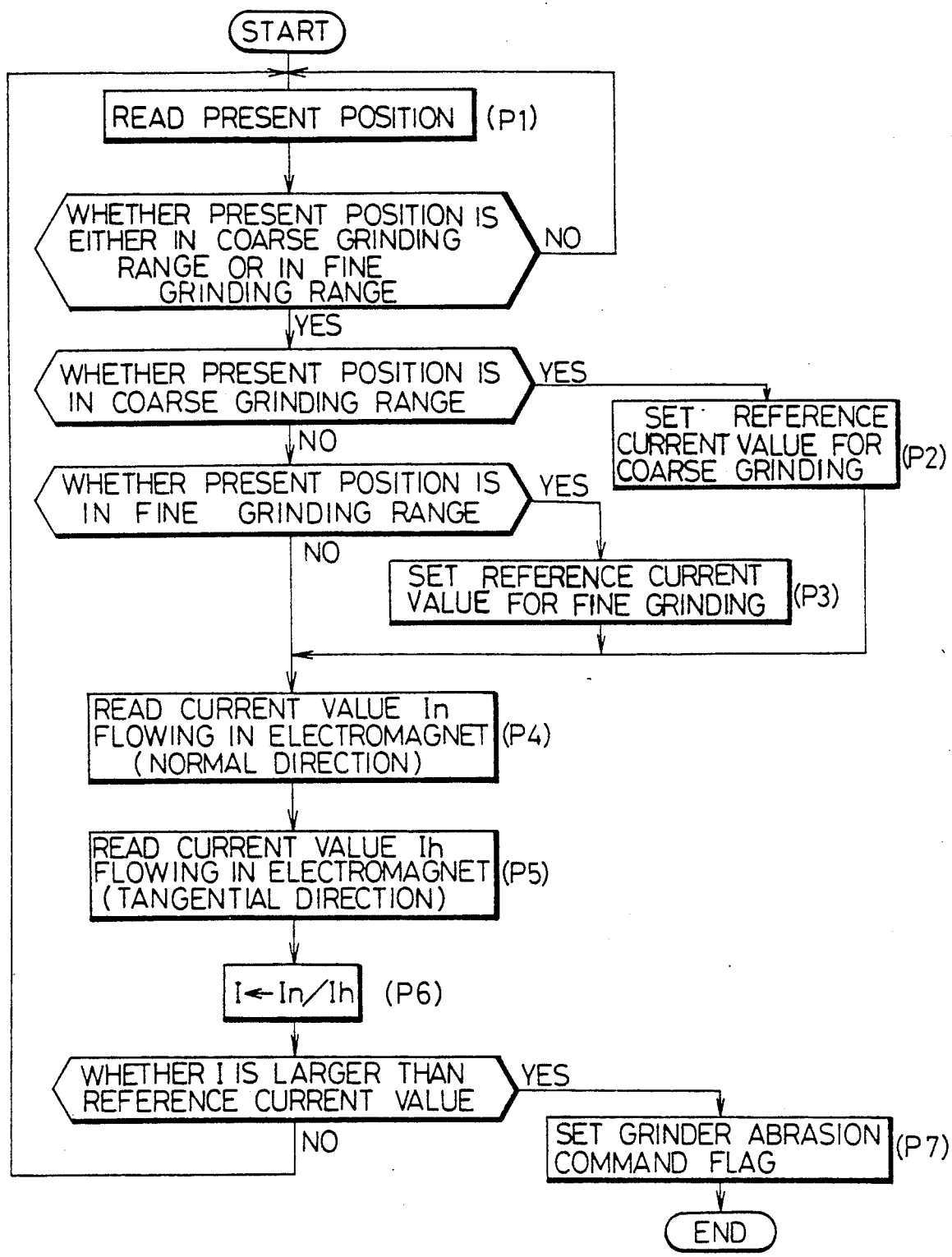

FIG. 11 and FIG. 12 show a fourth embodiment of the present invention. In the fourth embodiment, current values are read not only from normal direction electromagnets 5b, etc. but also from tangential direction electromagnets 5a (6a) and 5c (6c). The abrasion of the grinder 21 is determined based on the ratio of the current value In of the former electromagnets and the current value Ih of the latter electromagnets, and based on this determination, a command for correction of the grinder is outputted.

Namely, the position of the cutting table is read according to a signal from a rotary encoder 48 (P1). When the present position of the cutting table is in the coarse grinding range, a hereinafter described reference current value for coarse grinding is set (P2), and a reference current value for fine grinding is set if the position of the cutting table is in the fine grinding range (P3). Then, a current value In flowing in the normal direction electromagnets 5b, etc. is read (P4), further a current value Ih flowing in the tangential direction electromagnets 5a, etc. is read (P5). The ratio I of the current value In and the current value Ih is calculated (P6). When the ratio I is larger than a predetermined reference value, it is determined that the grinder 21 is abraded, and accordingly a command, which requires correction of the grinder to be carried out after the present cycle of grinding work and before the following cycle of grinding work, is inputted into a display apparatus 58 (P7). The above determination method utilizes the phenomenon in which the ratio of the tangential component force and normal component force of the load acting against the spindle changes when abrasion of the grinder 21 develops.

In this manner, the micro-computer 45 determines the abrasion of the grinder 21 and outputs the command for correction of the grinder in order to carry out grinding work with an optimum cutting efficiency, whereby the grinding work is carried out with high accuracy and high efficiency.

In the above embodiments, a workpiece is moved relative to the grinder (or spindle), but the grinder could be moved relative to a workpiece instead.

Also in the above embodiments, the electromagnets are disposed in a vertically criss-cross fashion, but they could be disposed in an obliquely criss-cross fashion, in other words in an X fashion instead. In the later case, current values flowing in the electromagnets are read, and the tangential and normal components of a load acting against the spindle 3 can be calculated.

Further, in the above embodiments, the machining apparatus having a main spindle supported by magnetic bearings is used in a grinding apparatus, however it can also be used in other machining apparatus such as milling machine, drilling machine, etc.

As described in the foregoing, according to the present invention, the machining control means maintains an optimum machining condition based on current values flowing in the electromagnets, whereby machining work is carried out under an optimum condition, and the machining accuracy and efficiency can be improved.

In particular, according to the first embodiment, the servo-motor is controlled in such a manner that each of the machining loads in the normal direction during coarse grinding and during fine grinding becomes constant at a respectively different value. This method provides highly accurate grinding work including improved cylindricality of a workpiece.

According to the second and fourth embodiments, the machining control means outputs a command for correction of the grinder upon determining abrasion of the grinder, whereby a workpiece is always ground with an optimum cutting efficiency, and therefore highly accurate and highly efficient grinding work can be achieved.

Further, according to the third embodiment, the time for spark-out can be made shorter than a time duration set by a timer, which shortens the total grinding time and improves grinding efficiency.

What is claimed is:

1. A machining apparatus having a main spindle supported by magnetic bearings, comprising:
   a spindle having means at one end thereof for holding a tool;
   electromagnets for radially and axially supporting said spindle by magnetic forces without contacting said spindle;
   position detecting means for detecting radial and axial position of said spindle;
   control means responsive to outputs from said position detecting means for controlling currents flowing in said electromagnets;
   current means for measuring current values in at least one of said electromagnets; and
   machining control means for controlling at least one controllable variable by controlling current values flowing in said electromagnets according to said measured current values.

2. A machining apparatus having a main spindle supported by magnetic bearings according to claim 1, wherein said machining control means includes means for controlling the cutting load in accordance with said measured current values.

3. A machining apparatus having a main spindle supported by magnetic bearings according to claim 1, wherein said machining control means includes means for controlling the cutting speed for a tool held by said spindle in accordance with said measured current values.

4. A machining apparatus having a min spindle supported by magnetic bearings according to claim 1, wherein said machining control means includes means for outputting tool correction commands in accordance with said measured current values.

5. An apparatus for performing a machining operation on a workpiece, comprising: a rotary spindle having means for releasably holding a tool for performing a machining operation on a workpiece; electromagnetic bearing means responsive to current flowing therein for producing magnetic forces effective to magnetically support the spindle in the radial and axial directions thereof during the machining operation; position detecting means for detecting the radial and axial positions of the spindle and producing corresponding detection signals; control means responsive to the detection signals for controlling the flow of current in the electromagnetic bearing means; current measuring means for measuring the value of current flowing in the electromagnetic bearing means and producing a measurement signal corresponding to the measured current value; and machining control means responsive to the measurement signal for controlling at least one controllable variable of the machining operation in accordance with the measured current value.

6. An apparatus according to claim 5; including converting means for converting the measurement signal into a digital signal indicative of the measured current value and applying the digital signal to the machining control means; and the machining control means includes memory means for storing data representative of at least one machining operation variable as a function of predetermined values of current flowing in the electromagnetic bearing means, and means for retrieving data from the memory means in response to the digital signal to control the at least one machining operation variable in accordance with the measured current value.

7. An apparatus according to claim 6; including means for inputting data representative of at least one machining operation variable into the memory means.

8. An apparatus according to claim 6; wherein the memory means stores data representative of the machining load whereby the machining load is controlled in accordance with the measured current value.

9. An apparatus according to claim 6; wherein the memory means stores data representative of the machining speed whereby the machining speed is controlled in accordance with the measured current value.

10. An apparatus according to claim 6; wherein the memory means stores data representative of tool correction commands whereby the tool correction commands are controlled in accordance with the measured current value.

11. An apparatus according to claim 5; wherein the electromagnetic bearing means includes a plurality of electromagnets each having a coil in which current flows to produce the magnetic forces; and the current measuring means comprises means coating with at least one of the electromagnet coils for measuring the value of current flowing therein and producing a corresponding measurement signal.

12. An apparatus according to claim 11; wherein the means coating with at least one of the electromagnetic coils comprises a current transformer.

13. An apparatus according to claim 11; including converting means for converting the measurement signal into a digital signal indicative of the measured current value and applying the digital signal to the machining control means; and the machining control means includes memory means for storing data representative of at least one machining operation variable as a function of predetermined values of current flowing in the electromagnetic bearing means, and means for retrieving data from the memory means in response to the digital signal to control the at least one machining operation variable in accordance with the measured current value.

14. An apparatus according to claim 13; including means for inputting data representative of at least one machining operation variable into the memory means.

15. An apparatus according to claim 13; wherein the memory means stores data representative of the machining load whereby the machining load is controlled in accordance with the measured current value.

16. An apparatus according to claim 13; wherein the memory means stores data representative of the machining speed whereby the machining speed is controlled in accordance with the measured current value.

17. An apparatus according to claim 13; wherein the memory means stores data representative of tool correction commands whereby the tool correction commands are controlled in accordance with the measured current value.

* * * * *